No. 840,846. PATENTED JAN. 8, 1907.
J. HEBERLING.
DUMPING WAGON.
APPLICATION FILED SEPT. 23, 1904.
2 SHEETS—SHEET 1.
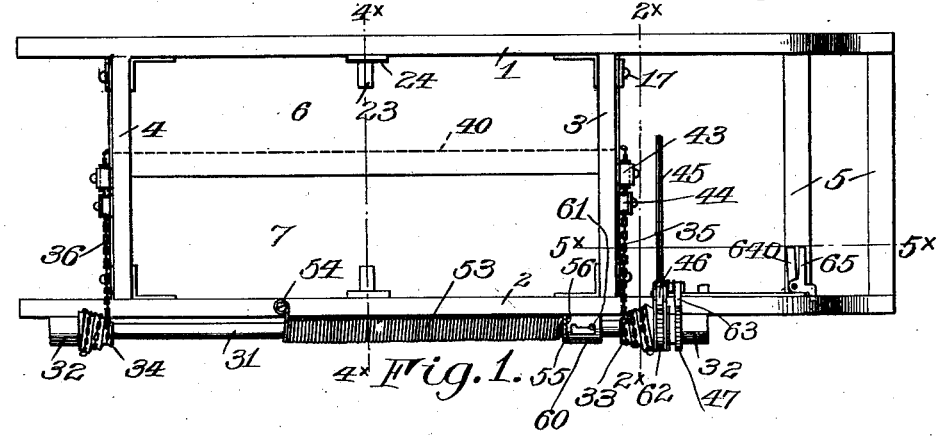
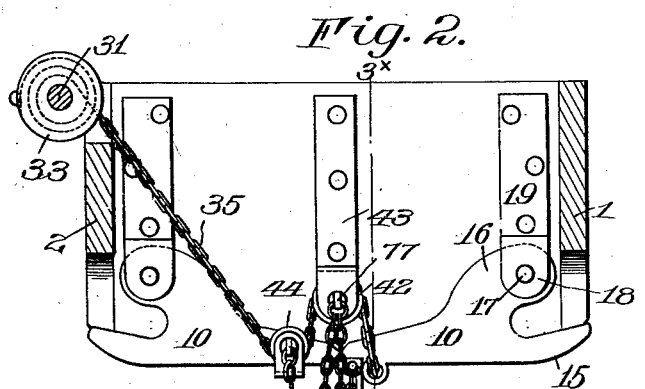
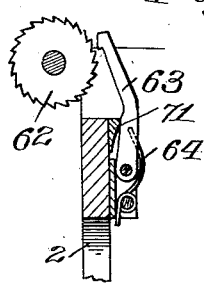
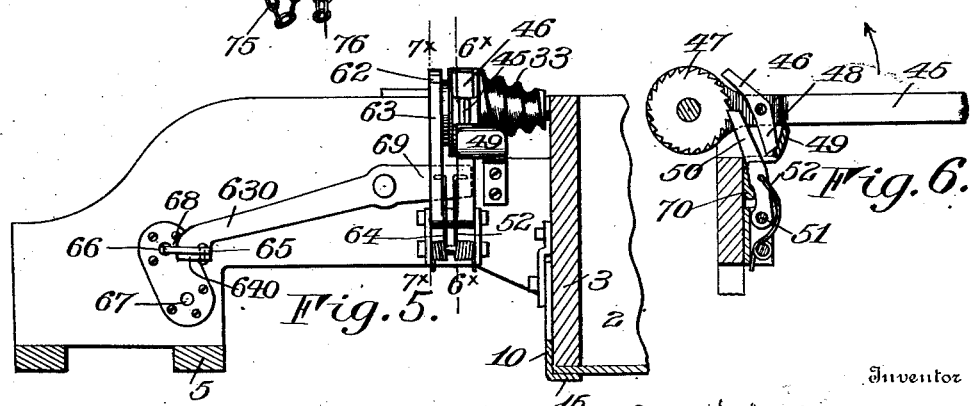

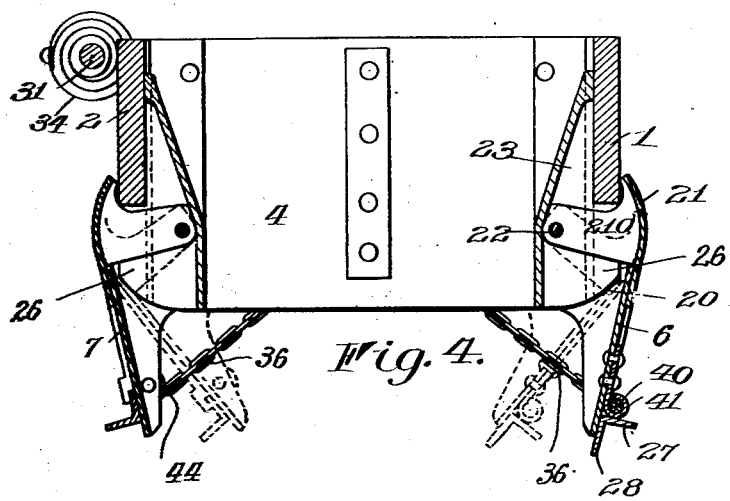
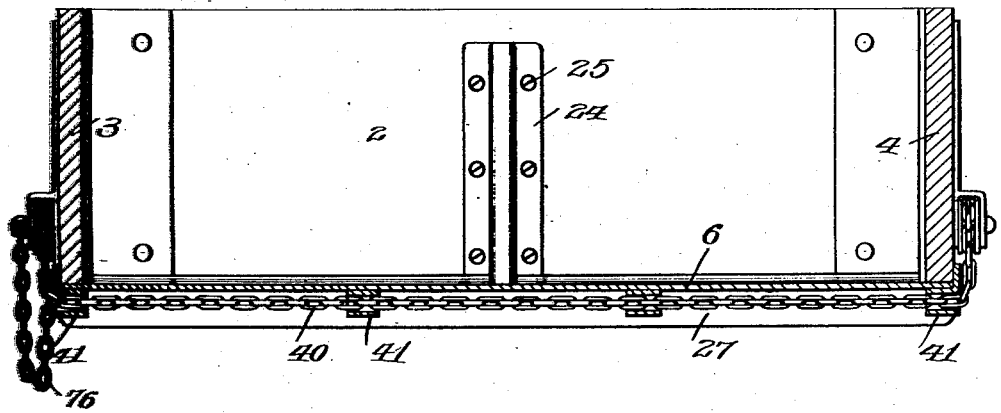

UNITED STATES PATENT OFFICE.

JOHN HEBERLING, OF ROCHESTER, NEW YORK.

DUMPING-WAGON.

No. 840,846.        Specification of Letters Patent.        Patented Jan. 8, 1907.

Application filed September 23, 1904. Serial No. 225,592.

*To all whom it may concern:*

Be it known that I, JOHN HEBERLING, of the city of Rochester, in the county of Monroe and State of New York, have invented certain new and useful Improvements in Dumping-Wagons; and I do hereby declare the following to be a full, clear, and exact description of the same, reference being had to the accompanying drawings, forming a part of this specification, and to the reference-numerals marked thereon.

My present invention relates to dumping-wagons, and particularly to that class in which the contents of the box are deposited by an opening movement of the bottom sections; and it has for its object to provide an improved means for movably attaching said sections to the wagon-box and also mechanism for operating them whereby they may be tightly closed and when released will be allowed to swing clear of the deposited material.

To these and other ends my invention consists in certain improvements and combinations of parts, all as will be hereinafter more fully described, the novel features being pointed out in the claims at the end of this specification.

In the drawings, Figure 1 is a top plan view of a wagon-box, illustrating the mechanism embodying my invention applied thereto. Fig. 2 is a front elevation, partly in section, taken on the line 2× 2× of Fig. 1. Fig. 3 is a longitudinal sectional view on the line 3× 3× of Fig. 2. Fig. 4 is a transverse sectional view on the line 4× 4× of Fig. 1. Fig. 5 is a detail sectional view on the line 5× 5× of Fig. 1. Fig. 6 is a similar view on the line 6× 6× of Fig. 5, and Fig. 7 is a similar view on the line 7× 7× of Fig. 5.

Similar reference-numerals in the several figures indicate similar parts.

In illustrating my invention I have shown it applied to a wagon-box comprising the parallel side-boards 1 and 2, between which are arranged the front end-board 3 and the rear end-board 4, said side-boards preferably being provided with the ends extending in rear of the board 4 and the forward ends projecting in advance of the front-board 3 and connected by bolsters 5, said ends forming the supports by which a wagon-box may be mounted on the axles of the supporting-wheels, which are not shown.

The bottom of the wagon is composed of movable sections 6 and 7, extending longitudinally of the wagon-box, their approximate edges meeting at the center thereof, as shown. Each of these sections is supported at its forward and rear ends upon hinge members comprising vertically-extending faces 10, extending over the ends of the section, having flanges 15, forming supports for the sections, and also provided with ears 16, by means of which they are secured to the end-boards 3 and 4, their pintles or pivotal points 17 being supported in the offset ends 18 of straps 19. By arranging the hinge members at the ends of the box their pivotal points may be located above the plane of the bottom of the wagon and between the proximate faces of the side-boards 1 and 2, so that when the bottom sections are released their inner edges will swing downwardly and outwardly and their outer edges will swing outwardly and upwardly, so that their lower edges when opened will be supported a considerable distance from the ground to avoid the pile of deposited material, said outer edges being adjacent to the sides of the box— a feature which enables me to provide a wagon-box of the standard depth or of even greater depth, if desired, without increasing the height of the box from the ground.

To facilitate the outward movement of the sections and to form a tight joint between the bottom and the sides of the box, I round the bottom edges of the latter on arcs having the pivotal points 17 as centers, and also round or curve the outer bottom corners of the ends 3 and 4, as indicated at 20 in Fig. 4, the outer edges of the bottom sections 6 and 7 being correspondingly curved, as indicated at 21, to fit the curved portions of the box. As will be seen, these edges will engage the sides of the box throughout their length when the bottom is opened and will prevent them from becoming warped or twisted in sustaining the weight of the load or in case of engagement with the deposited material when the wagon is being drawn away.

Arranged intermediately of the end-boards additional hinge members are provided by upwardly-extending arms 210, journaled on pivots 22, supported in channel-plates 23. The latter are open at their rear and bottom sides and are provided with laterally-extending faces or flanges 24, through which pass screws or bolts 25, securing them to their respective side-boards 1 and 2 in alinement with slots 26, formed therein to permit the outward movement of the arms 210. The bottom is further strengthened longitudinally by means of an angle-bar 27, secured to the section 6 so that one side thereof extends over the adjacent edge of the section 7 and forms a covering-strip 28.

The mechanism for closing the bottom of the wagon embodies a shaft 31, extending longitudinally of the wagon-box and preferably journaled at one side thereof in the bearing 32. Attached to the shaft are conical winding-drums 33 and 34, provided with helical grooves adapted to receive winding chains or cables 35 and 36, respectively attached to the bottom sections, as will be further described, and also connected to the drums at points near their bases or larger ends, whereby the initial movement imparted to the shaft 31 will cause the bottom sections to be drawn quickly into their normal horizontal position. As these sections approach their position the chains or cables travel toward the smaller ends of the drums or cones, thus reducing the leverage required to operate the shaft 31 and enabling the operator to exert a greater power to draw and secure the doors into the closed position.

Owing to the difficulty occasioned by the unequal stretching of chains, cables, or other flexible connections employed for closing the opposite ends of the bottom sections of a wagon which allows one end or the other to sag after a comparatively short use, I provide means for equalizing them, consisting in the present instance of an intermediate section of cable or chain 40, attached to each of the end portions 35 and 36 and extending beneath the bottom section 6 and held loosely in place by means of eyes or thimbles 41. In order to close both of the bottom sections by means of a single flexible connection, I pass the cable or chain over a support in the form of a roller or pulley 42, journaled in the strap 43, arranged centrally upon each of the end-boards, and I also provide a similar support or pulley 44 on each end of the section 7 and beneath which the cables or chains extend, as shown particularly in Fig. 2. As the chains or cables 35 and 36 are attached to the bottom section, which is farther removed from the winding-shaft, and are permitted to slip or travel around the supports or pulleys 44 on the nearer or adjacent section thereto, it will be seen that the latter section will be closed in advance of the former, and thus cause the covering-strip 28 to be properly positioned over the meeting edges of the two sections each time they are closed.

The handle 45 for rotating the winding-shaft is journaled thereon at its forward end and carries a pawl 46, adapted to coöperate with the teeth in a ratchet-wheel 47 when rotated in the direction indicated by the arrow in Fig. 6 and having the end 48 adapted to coöperate with a stationary stop 49 to disengage it from the ratchet-wheel when the handle is moved to the position shown in Fig. 6. Also coöperating with the ratchet-wheel is a detent 50, pivoted on an arbor 51 and normally held in operative position by a spring 52. As the sections are pivoted, as before described, on centers arranged above them and located between the sides of the wagon-box, they will, if opened into a more or less vertical position by the downward movement of the contents of the box, draw the chains or cables outwardly; but when they are freed they will rotate into the position indicated by the dotted lines in Fig. 4. The cables or chains having been drawn outwardly sufficiently to allow the bottom sections to open outwardly to their limit of movement, they will ordinarily sag downwardly and hang loose, as the sections swing inwardly toward each other when they are free of the deposited material. To take up the slack in the cables or chains 35 and 36 thus occasioned, I provide a tension device, such as a spring 53, secured at one end to the wagon-box (shown at 54) and attached at its opposite end to a collar 55, journaled on the shaft, and provided with ratchet-teeth 56, adapted to engage corresponding teeth on a sleeve 60, secured to the shaft 31 by a pin 61, but permitting a longitudinal movement thereon to disengage the tension device when desired. The latter, it will be understood, may be adjusted by the rotation of the collar 55, so that the bottom sections may be entirely closed, the operator being then only required to partially rotate the winding-shaft to firmly secure and lock the bottom sections tightly against the box. It is desirable, however, that the tension device be prevented from operation until the wagon has been drawn away from the deposited material, and to this end the shaft is further provided with a ratchet-wheel 62, the teeth of which extend in a direction opposite to those upon the ratchet-wheel 47. A dog or pawl 63, located adjacent the detent 50 on the arbor 51, is held in the operative position by means of a spring 64, similar to the spring 52. As the pawl 50 operates to prevent a rotation of the shaft 31 and to hold the bottom sections in a closed position and the dog or pawl 63 operates to prevent the rotation of the shaft under the action of the tension device 53, I provide a means for alternately moving them into and out of operative position. In the present instance this is accomplished by a lever pivoted to the side-board 2 and having a forwardly-extending end 630, provided with a lateral extension 640, which may be engaged and depressed by the operator's foot. Pivoted to this extension is a foot-operated latch 65, having a nose or point adapted to engage apertures 66 or 67, formed in a plate 68, to hold the lever against accidental operation, either to release the wagon-bottom or the tension device. The rear end 69 of this lever extends beneath the detent 50 and the pawl 63 and is provided with two shoulders 70 and 71, respectively coöperating therewith, so that when the end 69 of the lever is elevated the detent 50 will be moved outwardly to the inoperative position, and the pawl 63 will be released and moved inwardly into engagement with the ratchet-wheel 62 by its spring 64.

At the forward end of the wagon-box I provide stay-chains 75 and 76, both of which are connected at one end to an eye 77 on the front board 3 and attached at their outer ends to the corners of the sections 6 and 7, respectively, for the purpose of preventing the sections from being subjected to any undue strain as may be occasioned by an attempt on the part of the operator to turn the wagon at an angle while it is above the material just deposited.

A dumping-wagon embodying my invention is simple in construction and consists of few parts, which may be readily formed and assembled. The arrangement of the hinge members whereby their pivotal points are located above the plane of the bottom and within the sides of the box affords a support for the bottom sections, preventing them from sagging and allowing them to swing outwardly and upwardly when released away from the deposited material without danger of their edges engaging therewith.

I claim as my invention—

1. The combination with a receptacle for transporting material comprising a box, movable bottom sections therefor, of hinges supporting the bottom sections beneath the box, the hinges on the respective sections having their pivotal points located in vertical planes lying within the sides of the box above the bottom sections.

2. The combination with a receptacle for transporting material comprising a box, a bottom composed of sections extending longitudinally beneath the box, of hinges supporting said sections, the hinges on the respective sections having their pivotal points located in different vertical planes lying within the box above the bottom sections and arranged to cause said sections to rotate away from each other.

3. The combination with a wagon-box embodying sides and ends and a bottom composed of separate sections extending beneath said sides and ends, of hinges supporting said sections extending upwardly therefrom and pivoted to the wagon-box the pivotal centers being located in planes lying within the box.

4. The combination with a wagon-box embodying sides and ends and a bottom composed of sections extending longitudinally of the box beneath the sides and ends thereof, of hinges supporting said sections and pivoted to the ends of the box.

5. The combination with a wagon-box embodying sides and ends and a bottom composed of sections extending longitudinally thereof, of hinges supporting said sections and pivoted to the ends of the box, an intermediate hinge member arranged on each section and supports for said members arranged within the box.

6. The combination with a wagon-box embodying sides and ends and a bottom composed of sections extending longitudinally thereof, of hinges supporting said sections pivoted to the ends of the box, housings extending inwardly from the sides of the box, and intermediate hinge members on the sections pivoted within the housings.

7. The combination with a wagon-box embodying sides and ends and a sectional bottom for the box extending beneath the sides and ends thereof, of a plurality of hinge members supporting said sections, pintles therefor and supports for the pintles arranged between the sides of the box above the bottom sections.

8. The combination with a wagon-box embodying sides and ends and a sectional bottom, of hinges journaled on the box and supporting the ends of the sections, channel-plates open at the bottom and rear sides and provided with laterally-extending flanges, devices engaging the latter and securing said plates to the sides of the box and hinge members on the bottom sections journaled in the channel-plates.

9. The combination with a wagon-box embodying sides and ends and a sectional bottom, of hinges journaled on the ends of the box having faces extending over the ends of the bottom sections and supporting-flanges on the faces extending beneath said sections.

10. The combination with a wagon-box and a bottom therefor composed of two independently-movable sections, of a single flexible connection coöperating with the forward and rear ends of both sections and means for winding both ends of said connection to close the sections.

11. The combination with a wagon-box and a bottom therefor composed of independently-movable sections having their side edges abutting when the sections are in normal closed position, of an angle-bar secured beneath the edge of one section and having its face projecting beneath the edge of the other section and means for operating the sections.

12. The combination with a wagon-box, and a bottom therefor composed of movable sections, supports on the box and similar supports on one of the bottom sections, of a winding-shaft extending longitudinally of the box a flexible connection attached to one of the bottom sections and passing over the supports on the box and the other bottom section and attached to the shaft at the ends of the box and a means for rotating the shaft.

13. The combination with a wagon-box, of a bottom composed of movable sections, a shaft and pulleys supported on the end of the box and one of the sections, a flexible connection attached to one of the sections and extending over the pulleys on the box and the other bottom section and passing upwardly at the ends of the box and attached to the shaft and means for rotating the latter.

14. The combination with a wagon-box and a bottom composed of two pivoted sections and a longitudinally-extending shaft, of a single flexible connection coöperating with each end of both sections and attached at its ends to the ends of the shaft and means for rotating the latter.

15. The combination with a wagon-box, a bottom composed of pivoted sections, of a shaft extending longitudinally of the box, conical winding-drums thereon and a flexible connection passing loosely beneath one of the sections and loosely engaging the other section and attached at its ends to the larger ends of both drums and means for rotating the latter.

16. The combination with a wagon-box, a bottom composed of movable sections and a winding-shaft, of flexible connections each attached to the shaft and loosely connected to the ends of the bottom sections, means extending between the connections for equalizing the tension between them and a device for operating the shaft.

17. In a dump-wagon, the combination with a box, a movable bottom therefor, a winding-shaft and a flexible connection between it and the bottom, of a ratchet-wheel on the shaft, a lever and a pawl thereon coöperating with the ratchet-wheel, a rigid stop coöperating with the pawl to adjust it into an inoperative position when the lever is moved into one position, a detent coöperating with the ratchet-wheel and movably supported on the box and a foot-lever independent of the detent and coöperating therewith to disengage it.

18. The combination with a wagon-box, having a movable bottom, a winding-shaft and a flexible connection between the former and the latter, of a device for locking the shaft against rotation in one direction, a tension device for rotating the shaft in the opposite direction, a second locking device for securing the shaft against the operation of the tension device, and means for alternately throwing said locking devices into and out of operative position.

19. The combination with a wagon-box, having a movable bottom, a winding-shaft and a flexible connection between the former and the latter, of means for rotating the shaft to wind said connection thereon, a tension device operating the shaft in the same direction, locking devices adapted to coöperate with the shaft to prevent its operation in opposite directions and means for alternately actuating said devices into and out of operative position.

20. The combination with a wagon-box, having a movable bottom, a winding-shaft and a flexible connection between the former and the latter, of means for rotating the shaft to wind said connection thereon, a tension device operating the shaft in the same direction, locking devices adapted to coöperate with the shaft to prevent its operation in opposite directions and an actuating device adapted to be moved by an operator's foot to alternately actuate said devices into and out of operative position.

21. The combination with a wagon-box, having a movable bottom, a winding-shaft and a flexible connection between the former and latter, of means for rotating the shaft to wind said connection thereon, a tension device operating the shaft in the same direction, locking devices adapted to coöperate with the shaft to prevent its operation in opposite directions, an actuating device adapted to be moved by an operator's foot to alternately actuate said devices into and out of operative position and a latch for locking said actuating device.

22. The combination with a wagon-box, having a movable bottom, a winding-shaft and a flexible connection between the former and latter, of a handle for rotating the shaft to wind up said connection, a tension device for operating the shaft in the same direction and two ratchet-wheels on the shaft having their teeth extending in opposite directions, a pawl coöperating with each ratchet and means coöperating with the pawls to alternately actuate them into and out of engagement with their respective ratchet-wheels.

23. The combination with a wagon-box, having a movable bottom, a winding-shaft and a flexible connection between the former and latter, of a handle for rotating the shaft to wind up said connection, a tension device for operating the shaft in the same direction and two ratchet-wheels on the shaft having their teeth extending in opposite directions, a pawl coöperating with each ratchet and a foot-lever coöperating with both pawls to actuate them alternately into and out of operative position relatively to their respective ratchet-wheels.

24. In a self-dumping wagon, the combination with a wagon-box, of a movable bottom thereon and devices for retaining and supporting it in closed position and connections between the box and bottom for automatically guiding the latter outwardly and upwardly in proximity to the sides of the box upon a center of movement located within the wagon-box when the retaining devices are released.

25. In a self-dumping wagon, the combination with a wagon-box, a movable bottom located exteriorly of the box and a retaining device for holding the bottom closed, of means for movably supporting and guiding the bottom to automatically rotate it on a center located within the wagon-box to move said bottom laterally and vertically in proximity to the sides of the box during its downward movement when the retaining device is released.

26. In a self-dumping wagon, the combination with a wagon-box and a swinging bottom therefor, of means for supporting the bottom exteriorly of the box and guiding it in proximity to the sides of the box to swing about a pivotal center located above the bottom and within the box.

27. In a self-dumping wagon, the combination with a wagon-box, two movable bottom sections therefor and devices for retaining them in the closed position, of means for supporting the sections at their outer sides and guiding the sections to rotate on centers located within the wagon-box to move said sections laterally away from each other and vertically relatively to the box and in proximity to the sides thereof when the retaining devices are released to permit them to open downwardly.

28. In a self-dumping wagon, the combination with a wagon-box, two movable bottom sections therefor and devices for retaining them in the closed position, of means for supporting the sections at their outer sides and guiding the sections to rotate on centers located within the wagon-box to move said sections laterally away from each other and vertically relatively to the box when the retaining devices are released to permit them to open downwardly.

JOHN HEBERLING.

Witnesses:
F. N. HOWARD,
WALTER B. PAYNE.